US007052062B2

(12) United States Patent
Catt et al.

(10) Patent No.: US 7,052,062 B2
(45) Date of Patent: May 30, 2006

(54) TRAILERABLE REFRESHMENT STAND

(76) Inventors: Ronald Ray Catt, 15841 Chemical La., Huntington Beach, CA (US) 92649; Daniel L. Skorcz, 15841 Chemical La., Huntington Beach, CA (US) 92649

( * ) Notice: Subject to any disclaimer, the term of this patent is extended or adjusted under 35 U.S.C. 154(b) by 123 days.

(21) Appl. No.: 10/620,940

(22) Filed: Jul. 11, 2003

(65) Prior Publication Data

US 2005/0006422 A1 Jan. 13, 2005

(51) Int. Cl.
*B60P 3/025* (2006.01)
*E01C 19/20* (2006.01)

(52) U.S. Cl. ...................... 296/22; 296/24.36; 222/610

(58) Field of Classification Search .................. 296/22, 296/24.36; 222/608, 610
See application file for complete search history.

(56) References Cited

U.S. PATENT DOCUMENTS

| | | | | |
|---|---|---|---|---|
| 1,370,517 | A * | 3/1921 | Cheeseman | 296/22 |
| 2,771,318 | A * | 11/1956 | Jagsch | 296/22 |
| 2,845,780 | A * | 8/1958 | Conklin et al. | 62/291 |
| 3,940,175 | A * | 2/1976 | Robison | 296/22 |
| 4,225,059 | A * | 9/1980 | Kappos | 222/146.6 |
| 4,514,002 | A * | 4/1985 | McIntosh | 293/118 |
| 4,974,500 | A * | 12/1990 | Boyd et al. | 99/279 |
| 2002/0180228 | A1* | 12/2002 | Poarch et al. | 296/22 |

* cited by examiner

*Primary Examiner*—Dennis H. Pedder
(74) *Attorney, Agent, or Firm*—Matthew F. Jodziewicz

(57) ABSTRACT

A trailer, intended to be towed on public thoroughfares by a motorized vehicle, that readily converts to a mobile refreshment stand for use at parties and other places where a mobile refreshment stand may be desired having built-in refreshment disbursing, electrical power and refrigeration systems along with customer seating and storage space therein for carrying supplies.

35 Claims, 7 Drawing Sheets

TRAILERABLE REFRESHMENT STAND

BACKGROUND OF THE INVENTION

1. Field of the Invention

This invention relates generally to the field of trailers and more particularly to a novel and improved trailer capable of being towed on public thoroughfares by a motorized vehicle, such as a car or golf cart type vehicles, or even moved manually for short distances, and that readily converts to a mobile, self-contained refreshment stand for use at parties, sporting events, business functions and other places where a mobile refreshment stand may be desired in combination with a trailer having built-in refreshment disbursing, electrical power (for example, 120 VAC or 12VDC electrical systems by using generators, inverters, or battery power) and refrigeration or cooling systems along with built-in customer seating and storage space therein for carrying supplies.

2. Description of the Prior Art

Many social gatherings are occurring at outside locations that lack a central gathering spot, such as a mobile refreshment stand around which partygoers can congregate. As such, there is no cohesiveness of the partygoers and it is difficult to sustain the fun and excitement that a central gathering spot can provide. Also, a centralized meeting place enlivens a party by providing a spot to meet and greet both old and new friends, encouraging renewed and new friendships by its lively atmosphere and decor which can set the tone of a party.

Likewise, if a social gathering is planned, the planners must make provision for providing refreshment to the partygoers without causing permanent disruption to the facility or party location. This is especially difficult where the location is remote and liquid refreshment is to be disbursed, as electrical and refrigeration systems are normally desired and required for the successful and efficient disbursement of liquid refreshment to a crowd and not necessarily readily accessible in such locations. Thus, if such systems are to be provided separately, the planners must carefully pick a set-up location that is located close to existing facilities and, once chosen, cannot be changed without a great deal of difficulty if at all.

An example of an existing prior art mobile refreshment stand is U.S. Pat. No. 5,251,790 to Cohn et al. for a Mobile Bar for Dispensing Cold Beverages. However, known prior art examples appear to be mobile within a limited area, such as a building, or are mobile by hand movement only and lack the ability to be towed to a particular site by a motorized vehicle on public thoroughfares. Generally, these known prior art examples are all designed to be bought by a facility, such as a hotel or resort, and then moved by hand to a party location within the building or on the hotel/resort grounds where they are connected to external electrical power, drainage and refreshment disbursing systems. They are similar to movable pieces of furniture similar to a fancy table that can be utilized as a bar.

Known prior art trailers, such as picnic and camping trailers, evidenced by U.S. Pat. No. 3,940,175 to Robison for a Multi-Purpose Combination Trailer and Picnic Table; U.S. Pat. No. 3,492,042 to Nachtigall, Jr. for a Vehicle Body; U.S. Pat. No. 3,741,606 to Grier for a Camping Trailer; U.S. Pat. No. 4,167,284 to Messina for Collapsible Campers; U.S. Pat. No. 4,194,785 to Cox et al. for a Camper; U.S. Pat. No. 4,535,933 to Kuiper for a Vehicle with Tiltable Side Walls; U.S. Pat. No. 5,108,122 to Beagley for an Exhibitor Trailer; U.S. Pat. No. 4,842,316 to Lerma et al. for a Picnic Trailer Apparatus; and, U.S. Pat. No. 1,871,828 to Van Vorst for a Trailer, all lack the ability to provide the convenience and built-in systems in a unit having a configuration to provide for refreshment disbursement in an easy, convenient and efficient manner that can be towed on a public road.

The present invention deals with and solves the problems that arise in attempting to design and manufacture a mobile refreshment center that is capable of being easily moved to any desired spot and is self-supporting or generally independent of the environment in which it is placed to provide refreshment services while making a minimal impact on its environment.

Specifically, the present invention is directed toward meeting the problems that arise in attempting to design and manufacture a mobile refreshment center capable of being towed on public roads by a motorized vehicle and that can provide refreshment services and an attractive gathering spot for social functions.

SUMMARY OF THE INVENTION

It is an object of the present invention to provide a mobile refreshment stand that is capable of being towed by a motor vehicle on a public thoroughfare.

It is an additional object of the present invention to provide a mobile refreshment stand that is generally self-contained to provide liquid refreshment disbursing systems.

It is a further object of the present invention to provide a mobile refreshment stand that is generally self-contained to provide refrigeration or cooling systems to maintaining refreshments cool and to provide ice.

It is an object of the present invention to provide a mobile refreshment stand that is generally self-contained to provide electrical power for use at the stand.

It is an additional object of the present invention to provide a mobile refreshment stand that is generally self-contained to make a minimal impact on the environment where it is set up for use.

In general, the invention is embodied in a trailer that intended to be towed on public thoroughfares by a motorized vehicle. The trailer readily converts to a mobile refreshment stand for use at parties and other places where a mobile refreshment stand may be desired having built-in refreshment disbursing, electrical power and refrigeration systems along with built-in customer seating and storage space therein for carrying supplies.

DETAILED DESCRIPTION OF THE INVENTION

Figure 1:
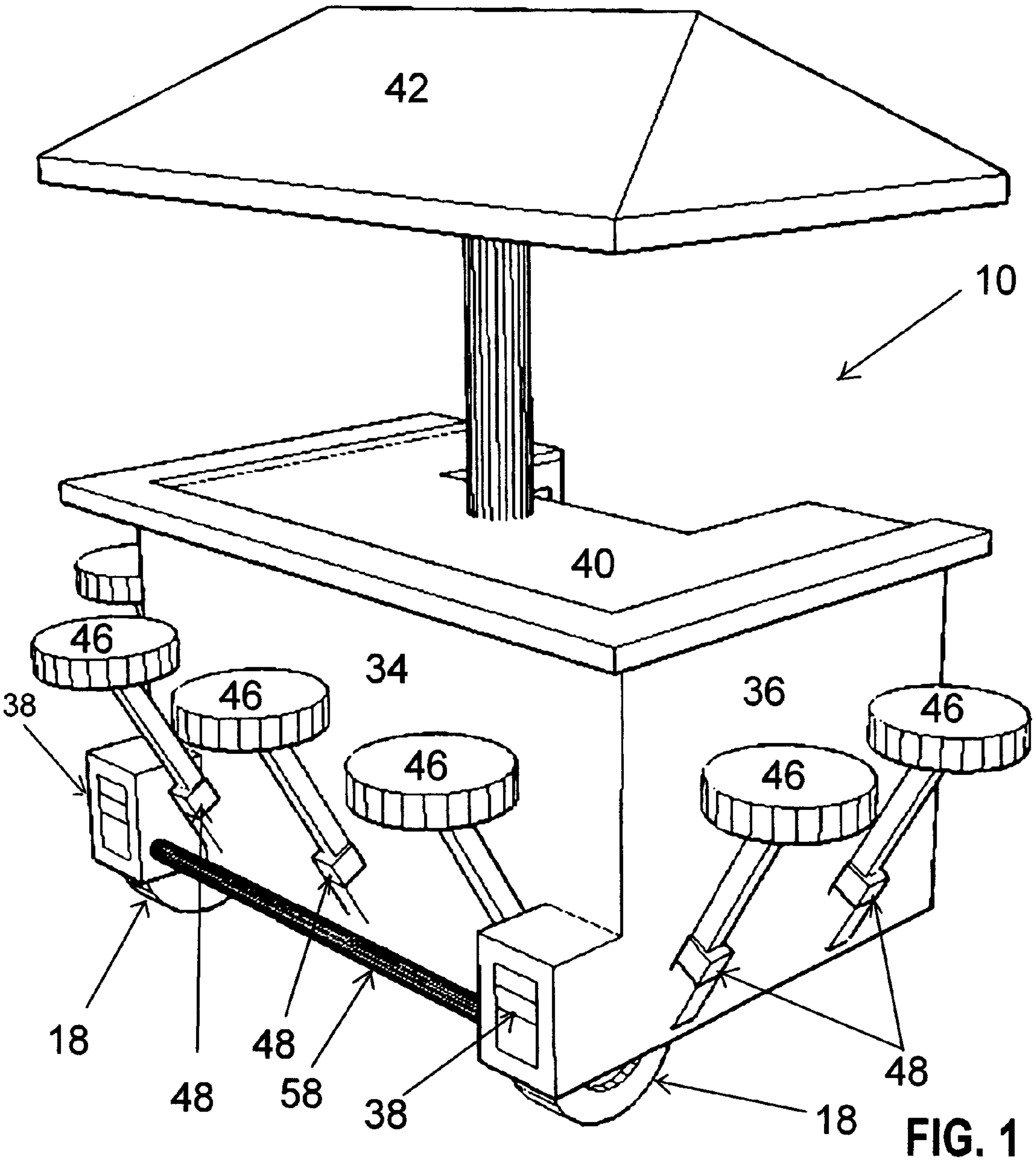
FIG. 1 is a perspective view of a mobile trailer embodying the present invention.
Figure 2:
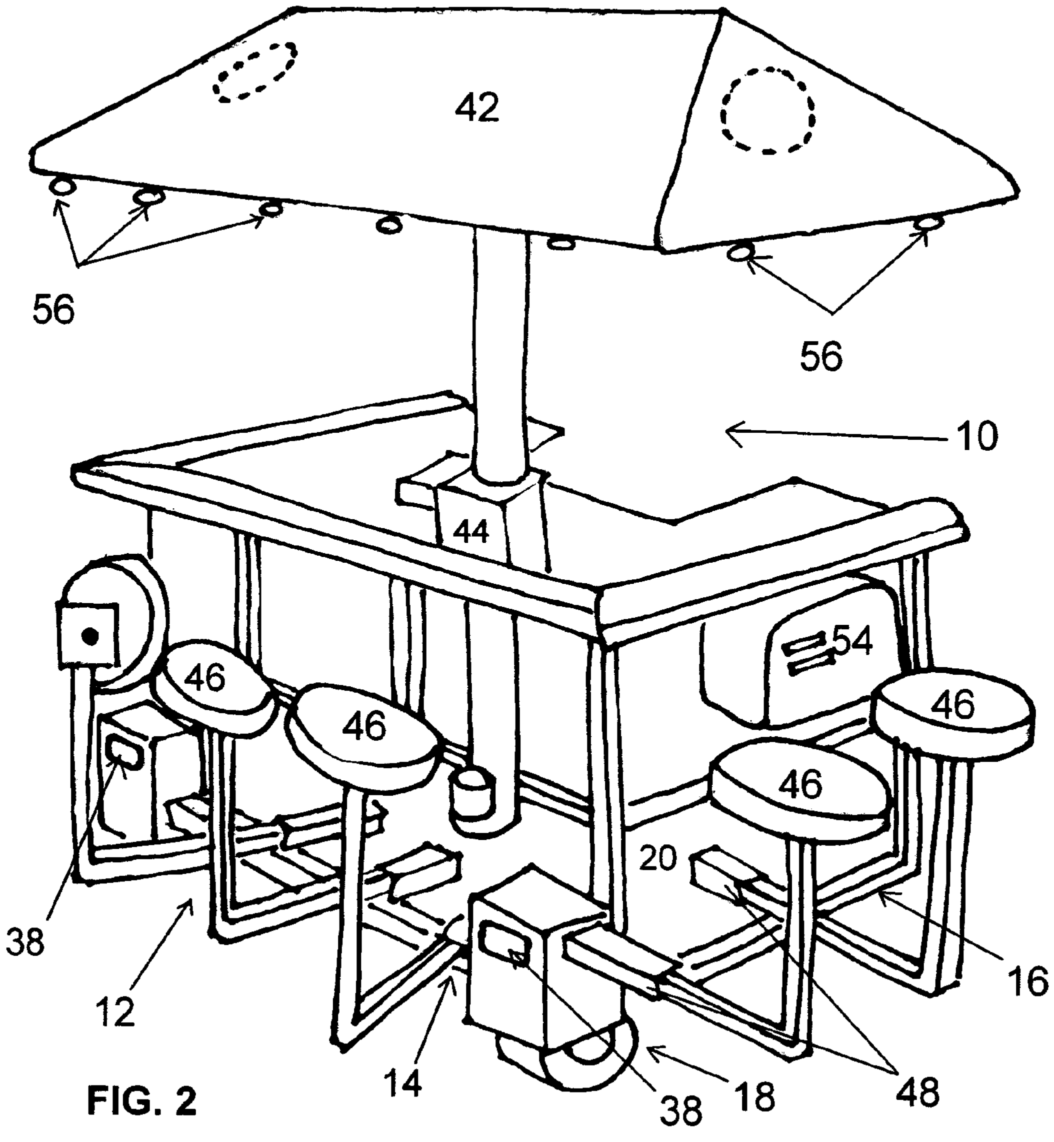
FIG. 2 is a skeletal perspective view of a mobile trailer embodying the present invention similar to that of FIG. 1.
Figure 3:
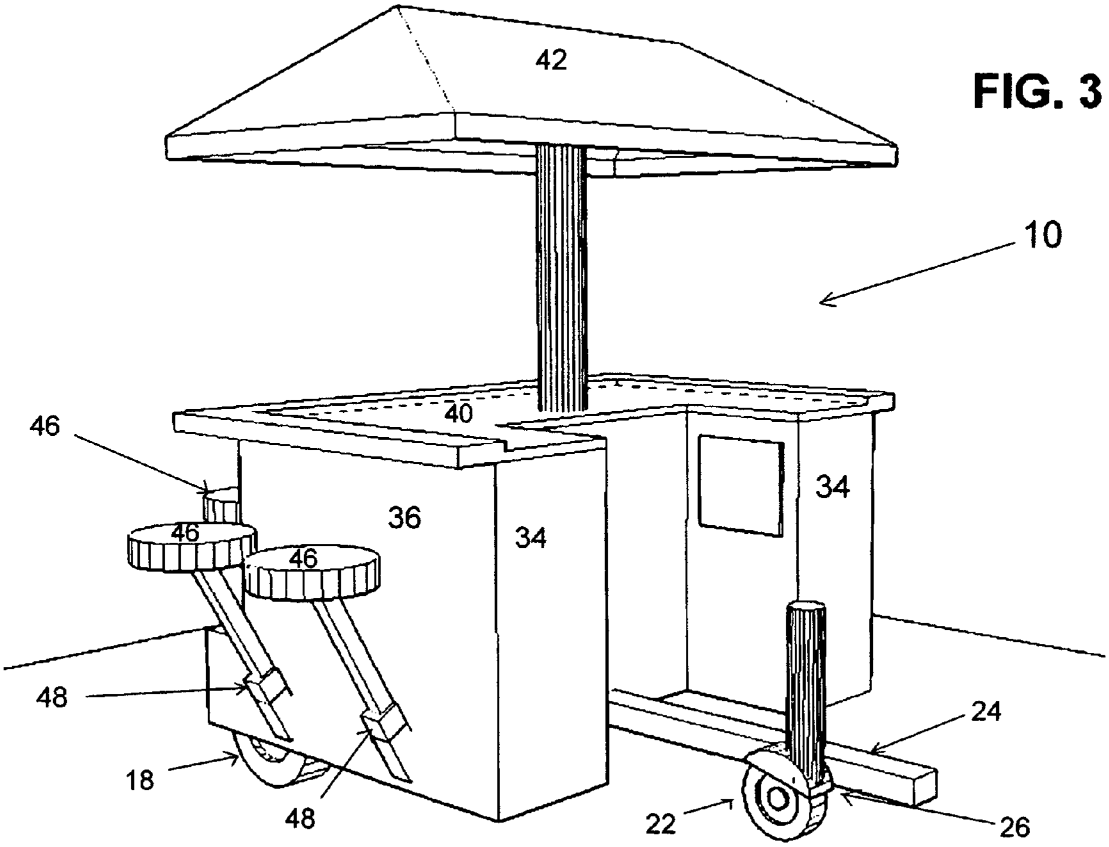
FIG. 3 is a perspective view of a mobile trailer embodying the present invention similar to that of FIG. 1 from a different angle.
Figure 4:
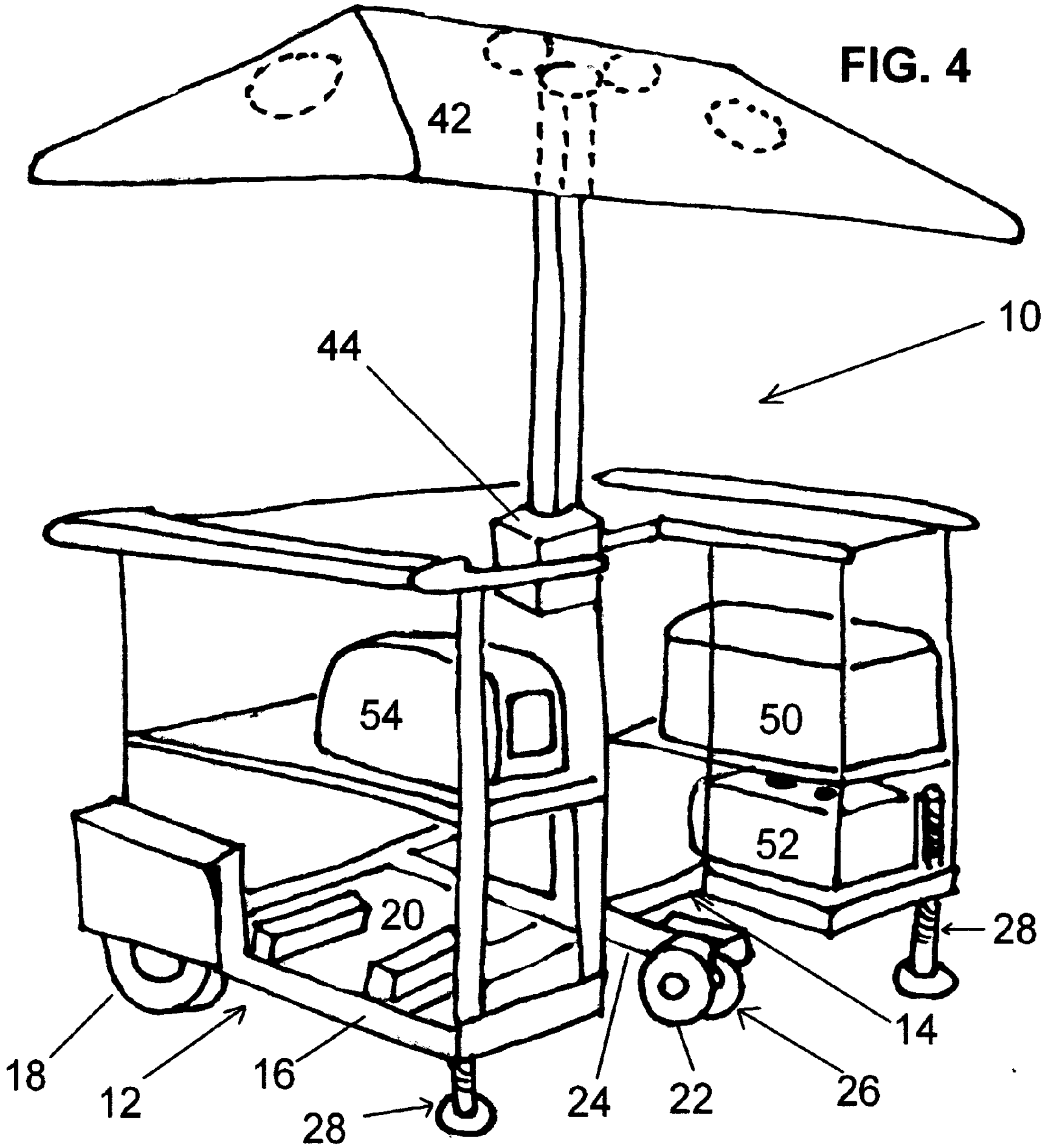
FIG. 4 is a skeletal perspective view of a mobile trailer embodying the present invention similar to that of FIG. 3.
Figure 5:
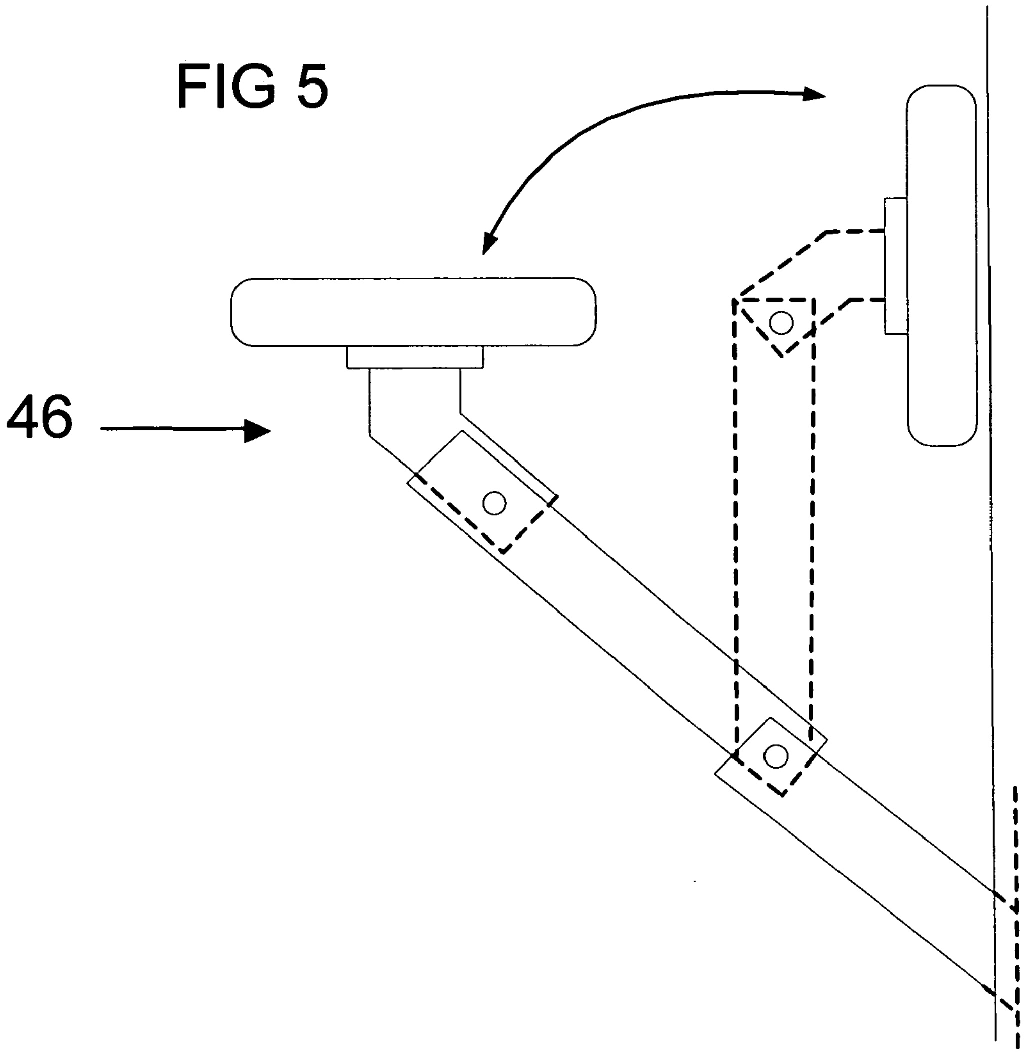
FIG. 5 is a detail view of one preferred embodiment of folding bar stools in a mobile trailer embodying the present invention; and, FIG. 6 is a detail view of a preferred road towing tongue and nose wheel assembly in a mobile trailer embodying the present invention.
Figure 6:
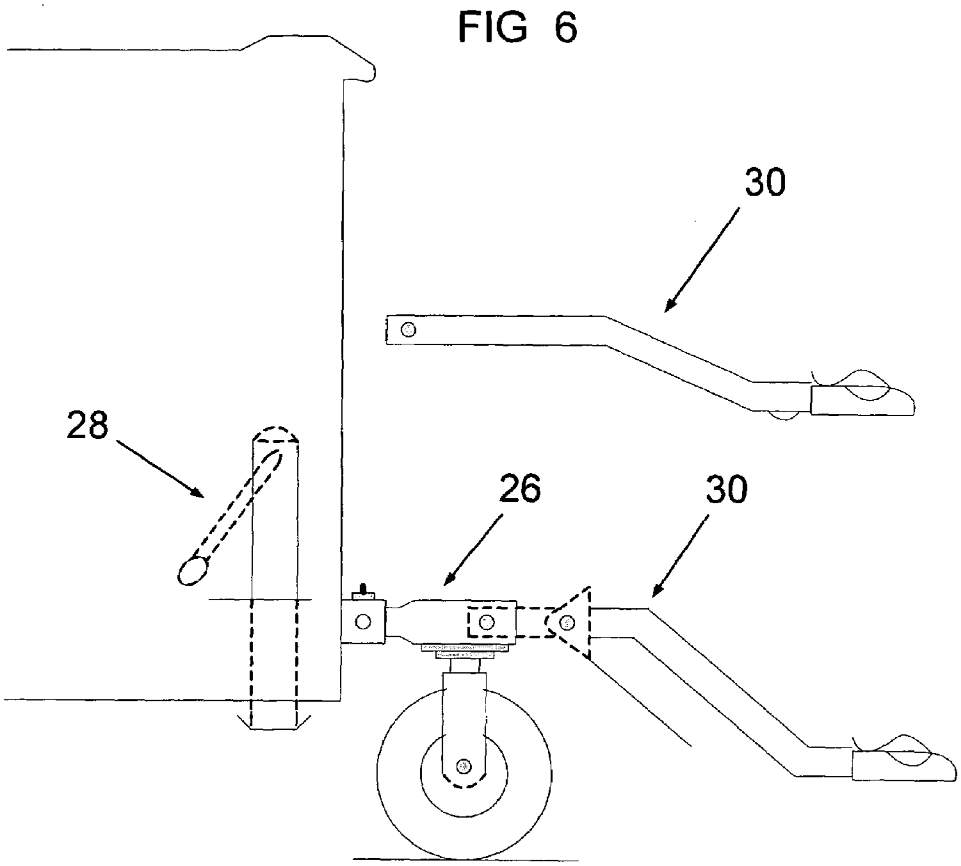

The present invention is directed to a mobile bar that is intended for towing behind a motorized vehicle as a trailer or more locally moved by hand. A preferred embodiment of the invention in a mobile bar, food and refreshment disbursement center is illustrated in FIGS. 1 to 6.

It is preferred, as shown in FIGS. 1 to 4, that the mobile bar, generally referred to by the reference numeral 10, be constructed on a trailerable, street legal chassis having a horizontally disposed frame 12 with longitudinally extending frame members 14 and transversely extending cross-frame members 16. An axle extends longitudinally of the frame 12 and has a wheel 18 rotatably supported on each end thereof to both support the chassis and allow easy movement of the chassis.

It is also within the scope of the present invention to utilize a metal flooring plate 20 to provide the longitudinal and transverse frame upon which the unit may be constructed without the use of individual beam members that may instead be welded directed to the flooring plate 20.

Generally, it is preferred that the wheels 18 be widely spaced apart for stability of the chassis during towing. To assist in stability, the wheels 18 are preferably connected to frame 12 using a torsion bar axle 13 best seen in FIG. 7 instead of a leaf spring arrangement. While the leaf spring arrangement is also included within the scope of this invention, use of a torsion bar axle arrangement allows for greater towing stability of the chassis by allowing a greater range of wheel placement due to the smaller installation footprint of the torsion bar axle versus the leaf spring arrangement.

To further assist in chassis stability, both during movement by golf cart or by hand and while the mobile bar is situated for use, it is preferred that a third wheel 22 be added to the other two wheels 18 discussed above. In order to do this, a tongue 24 is added to the chassis and extends transversely of frame 12. This tongue 24 is adapted to retain releasably a swiveling nose wheel assembly 26 that supports frame 12 in a tricycle arrangement. The nose wheel 26 arrangement preferably works in conjunction with a screw jack system 28 on the unit that allows for tongue 24 to be raised or lowered to level the chassis to accommodate uneven ground where the chassis is to be located for use. Thus locations with a given pitch can be easily accommodated by raising or lowering either or both the nose wheel assembly 26 or tongue 24 by using the screw jack mechanism to level the chassis for use. Two manually extended stabiliziers can be located adjacent the nose wheel assembly 26 for greater ease in stabilizing the unit on uneven ground. Likewise, it is also contemplated as being within the scope of this invention that a ratchet assembly may be used in place of the screw jack assembly. In fact, as indicated below the nose wheel assembly 26 may be removable from the towing bar 24 leaving the stabilizing mechanism in place to provide some security against unauthorized movement of the unit as there would only be two remaining wheels holding the unit, making it difficult to move the unit without the removed nose wheel assembly.

The tongue 24 is also adapted in one preferred embodiment to retain releasably a towing bar 30 for attachment to a motorized vehicle for towing of the mobile bar. This towing bar attachment 30 may attach directly to the extending tongue assembly 24, or to the nose wheel assembly 26, while the nose wheel assembly is connected to the extending tongue assembly 24.

Likewise, it is also contemplated that a jacking assembly may be incorporated into the extending tongue, attached thereto, or even incorporated into the chassis of the unit itself, so that the chassis may be leveled without a nose wheel being attached to the tongue.

Next, a compartment is necessary to form the body of the mobile bar unit and provide a gathering and storage space for use as described below.

A compartment 32 forms the body of the mobile bar unit and is mounted on the frame 12. Generally, the compartment is defined by a pair of transversely spaced apart longitudinally extending front and rear wall members 34, and a pair of longitudinally spaced apart transversely extending vertically disposed side wall members 36 interconnecting the front and rear wall members 34 at opposite ends thereof.

While the preferred description being described here is of a generally solid rectangular compartment, it is also within the scope of this invention and its claims that the compartment have other shapes, such as circular, oval or U-shaped as illustrated in the FIGURES.

As the chassis is to be street legal for towing on a public road by a motorized vehicle, braking and turning indicators 38 are mounted on the rear wall that meet the vehicle code requirements for a street-legal trailer. The indicators are provided with the standard electrical wiring for connection to the towing vehicle to control the braking and turning indicators 38.

As the unit is preferably used as a mobile bar, or a social gathering spot, preferably a generally flat counter top member 40 closes the top portion of the compartment 32 so that it may be used as a bar for refreshment or food disbursement and for the convenience of customers.

Likewise, both for visual effect as well as protection, a canopy 42 is provided to cover the bar or counter top area 40 of the unit. Preferably canopy 42 is telescopically supported relative to the counter top 40 so that it may be elevated thereabove to provide a shade and weather protective element for both the bar and customers seated thereat when extended, and a protective cover for counter top member 40 when collapsed. In the collapsed position, canopy 42 also provides protection to the unit while it is being towed and from vandals when not in use.

The canopy 42 may be manually extended using a ratchet, screw or pin and hole arrangement, or automatically by using a motorized unit 44 that is manually or automatically controlled for raising and lowering canopy 42.

As the unit is preferably not only a beverage or food dispensing trailer, but one that offers a social gathering and focal spot for parties, built-in seating 46 is provided for guests and customers to make the unit more friendly and independent of its surroundings. Accordingly, seat members 46 are mounted on the wall members 34, 36 of compartment 32. These seats may be pivotably mounted to the walls members 34, 36 as shown in THE FIGS., and move between a first extended position for use by an individual and a second stowed position against its wall member for towing purposes as shown best in FIG. 5. This is a preferable arrangement, as having the seats secured against the outside of the compartment during towing allows for greater storage space inside of the compartment than if the seats were removable and had to be stored in the compartment. However, this latter arrangement is also within the scope of the present invention and in that case the seats may be mounted on posts 48 extending from the compartment walls. In this case, the seats may be removed and stored in the compartment when not in use or when the unit is being towed or moved. Likewise, the seats may be mounted telescopically on posts connected to the chassis and have seat cushions that swivel from a generally horizontal position for sitting, to a vertical position flat against the sidewalls during travel or for storage purposes similar to that described above for pivotal attachment of the seats.

Figure 7:
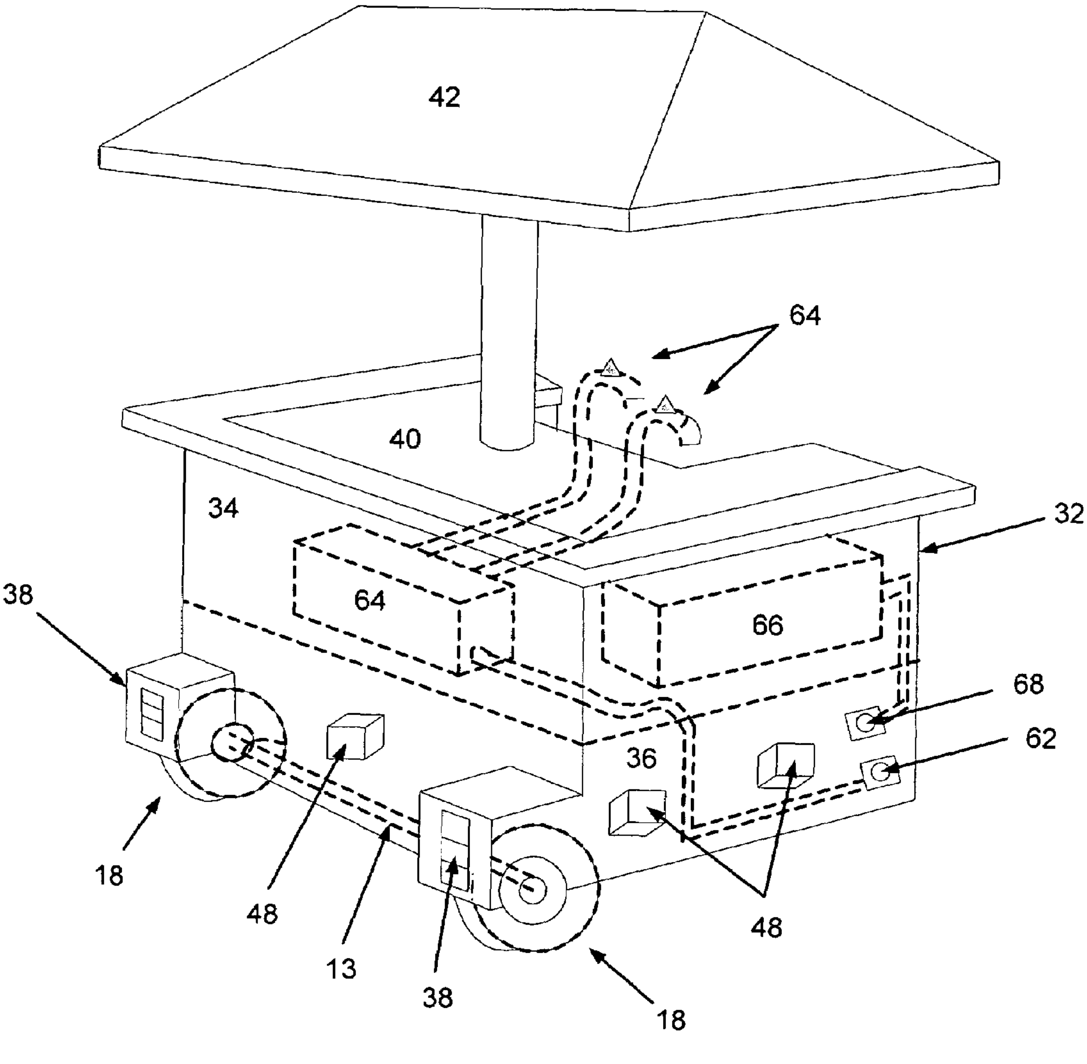
FIG. 7 is a perspective view of a mobile trailer embodying the present invention similar to that of FIG. 1, showing in dotted outline various internal components and connections.

The unit, as it is designed for the disbursement of liquid refreshments, and many times such liquid refreshments are best served chilled or with ice, preferably contains a refrigeration or cooling unit 50 mounted in compartment 32. One such preferred refrigeration or cooling unit 50 is to provide an insulated ice chest sub-compartment within the main compartment. In this embodiment, ice blocks would be stored in this ice chest for use. Also as best seen in FIG. 7, an electrically powered refrigeration unit 66 can be added to the main compartment and powered as indicated below by either an internal electrical source such as battery 52 or from an external electrical source via external electrical power plug 68.

In order to provide greater convenience to the use of the unit and to help achieve its objectives of providing a social gathering spot for parties and the like, a source of electrical power is preferably associated with the unit. One such preferable embodiment of an electrical power source is accomplished by mounting a battery 52 in the main compartment. The battery (or batteries) may be use alone to provide a DC voltage or may be used in conjunction with inverter units to provide AC voltage. An electrical generator 54 can also be mounted in the main compartment. Additionally, an input plug 60 designed for connection to an external source of electrical power may be added to the compartment so that once connected, electrical power is available to the unit.

As the unit is to be used as a mobile bar or social gathering venue for individuals, it is preferred that a beverage dispensing system 64 be also mounted in the main compartment for providing liquid refreshment. This can be accomplished by providing space in the main compartment for pressurized beverage containers such as beer kegs, or by providing a pressure system using electrical power or pressurized containers to dispense the liquid refreshment. However, while it is preferable that the liquid refreshment dispensing system be integral to the unit, it is also within the scope of this invention that provision be made for external connection 62 to an existing liquid refreshment dispensing system be provided. Specifically, external pressurized containers may be connected to input connections 62 in the unit that then allow the contents of the external containers to be dispensed using the internal liquid dispensing system 64 of the unit as best seen in FIG. 7.

The unit is to provide a spot that attracts and encourages social gathering. Accordingly, it is preferred that the unit provides both visual and physical attraction to the party goers. One such preferred method of making the unit visually attractive, is to add decoration to the walls and canopy of the unit, such as split bamboo to the compartment walls and thatching to the canopy to resemble a South Seas locale, or other theme exterior decors as desired, or electrical lights 56 mounted on the canopy 42 or counter top area 40 and powered by the electrical power source of the unit to provide atmosphere and a visual attractor noticeable even in crowded venues. The lighting has an additional benefit of aiding a bar tender's vision during evening hours when lighting might otherwise not be available from external sources. Electronic entertainment systems, such as a CD player, karaoke player, etc., may also be added to the compartment to entertain and draw a crowd. A method of making the unit physically convenient and attractive is the additional of a foot railing mounted on the lower portion of the main compartment sidewalls. The addition of a foot railing 58, especially on the back sidewall 34 gives the additional benefit of acting as a bumper during towing of the unit. If unnecessary to meet street legal towing requirements, the foot railing 34 may be removable or may be retractable into the body of the compartment of the unit/by being retractable towards the frame.

Certain modifications and improvements will occur to those skilled in the art upon a reading of the foregoing description. It should be understood that the present invention is not limited to any particular type of trailerable chassis design or arrangement. One of ordinary skill in the art will recognize that there are different manners in which these elements described above can provide to accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

What is claimed is:

1. A mobile bar intended for towing behind a motorized vehicle, comprising:

A horizontally disposed frame having longitudinally extending frame members and transversely extending cross-frame members;

An axle extending longitudinally of the frame and having a wheel rotatably supported on each end thereof;

A tongue extending transversely of the frame and having a nose wheel assembly supporting the frame, said tongue for attachment to a motorized vehicle for towing;

A compartment, mounted on said frame, defined by a pair of transversely spaced apart longitudinally extending front and rear wall members, and a pair of longitudinally spaced apart transversely extending vertically disposed side wall members interconnecting the front and rear wall members at opposite ends thereof;

A generally flat fixed counter top member closing the entire top of the compartment that may be used as a bar for refreshments;

A canopy, telescopically supported relative to the counter top members to be elevated thereabove to provide a shade and weather protective element therefore when extended and a protective cover for the counter top member when collapsed;

At least one seat member mounted on said rear wall member; and,

A beverage dispensing system mounted in said compartment for providing liquid refreshment.

2. A mobile bar as in claim 1 wherein said seat member is pivotally mounted to the rear wall member.

3. A mobile bar as in claim 1 wherein said seat member is removably mounted to the rear wall member on a post extending from the rear wall member.

4. A mobile bar as in claim 3 wherein said seat member is stowed in said compartment when removed from said post.

5. A mobile bar as in claim 1 wherein said beverage dispensing system is connected to an external beverage dispensing system.

6. A mobile bar as in claim 1 further comprising:

means for providing electrical power to the mobile bar mounted in said compartment.

7. A mobile bar as in claim 6 wherein said means for providing electrical power comprises at least one battery mounted in the compartment.

8. A mobile bar as in claim 6 wherein said means for providing electrical power comprises an electrical input connector mounted on the frame for connection to an external source of electrical power for providing electrical power to the mobile bar.

9. A mobile bar as in claim 1 further comprising:

means, mounted in the compartment, for providing refrigeration.

10. A mobile bar as in claim 9 wherein said refrigeration means comprises an insulated ice chest.

11. A mobile bar as in claim 9 wherein said refrigeration means comprises an electrically powered refrigeration unit.

12. A mobile bar as in claim 1 further comprising:

a foot railing mounted on the lower portion of at least the rear wall member.

13. A mobile bar as in claim 1 further comprising:

braking and turning indicators mounted on said rear wall, meeting the requirements of a street-legal trailer, for allowing the mobile bar to be towed on a public road by a motorized vehicle.

14. A mobile bar as in claim 13 further comprising:

a plurality of electrical lights mounted on said canopy.

15. A mobile bar as in claim 1 further comprising:

means connected to said canopy for raising and lowering said canopy.

16. A mobile bar as in claim 15 wherein said means for raising and lowering said canopy comprises an electrically actuated motorized assembly.

17. A mobile bar intended for towing behind a motorized vehicle, comprising:

A horizontally disposed frame having longitudinally extending frame members and transversely extending cross-frame members;

An axle extending longitudinally of the frame and having a wheel rotatably supported on each end thereof;

A tongue extending transversely of the frame for releasably retaining a swiveling nose wheel assembly supporting the frame, said tongue also for further releasably retaining a towing bar for attachment to a motorized vehicle for towing of the mobile bar;

A compartment, mounted on said frame, defined by a pair of transversely spaced apart longitudinally extending front and rear wall members, and a pair of longitudinally spaced apart transversely extending vertically disposed side wall members interconnecting the front and rear wall members at opposite ends thereof;

Braking and turning indicators mounted on said rear wall, meeting the requirements of a street-legal trailer, for allowing the mobile bar to be towed on a public road by a motorized vehicle;

A generally flat fixed counter top member closing the entire top of the compartment that may be used as a bar for refreshments;

A canopy, telescopically supported relative to the counter top members to be elevated thereabove to provide a shade and weather protective element therefore when extended and a protective cover for the counter top member when collapsed;

At least one seat member pivotally mounted on said rear wall member pivotable between a first extended position for use by an individual and a second stowed position against its wall member for towing;

Means, mounted in the compartment, for providing refrigeration;

Means for providing electrical power to the mobile bar mounted in said compartment; and, A beverage dispensing system mounted in said compartment for providing liquid refreshment.

18. A mobile bar as in claim 17 wherein said beverage dispensing system is further connected to an external beverage dispensing system.

19. A mobile bar as in claim 17 wherein said means for providing electrical power comprises at least one battery mounted in the compartment.

20. A mobile bar as in claim 17 wherein said means for providing electrical power comprises an electrical input connector mounted on the frame for connection to an external source of electrical power for providing electrical power to the mobile bar.

21. A mobile bar as in claim 17 wherein said refrigeration means comprises an insulated ice chest.

22. A mobile bar as in claim 17 wherein said refrigeration means comprises an electrically powered refrigeration unit.

23. A mobile bar as in claim 17 further comprising:

a foot railing mounted on the lower portion of at least the rear wall member.

24. A mobile bar as in claim 17 further comprising:

a plurality of electrical lights mounted on said canopy and powered by said electrical means.

25. A mobile bar as in claim 17 wherein said nose wheel assembly releasably receives the towing bar while the nose wheel assembly is connected to said tongue for low speed movement of the mobile bar such as by hand or a utility cart.

26. A mobile bar as in claim 17 further comprising:

means connected to said canopy for raising and lowering said canopy.

27. A mobile bar as in claim 26 wherein said means for raising and lowering said canopy comprises an electrically actuated motorized assembly.

28. A mobile bar intended for towing behind a motorized vehicle, comprising:

A horizontally disposed frame having longitudinally extending frame members and transversely extending cross-frame members;

An axle extending longitudinally of the frame and having a wheel rotatably supported on each end thereof A tongue extending transversely of the frame for releasably retaining a swiveling nose wheel assembly supporting the frame, said tongue also for further releasably retaining a towing bar for attachment to a motorized vehicle for towing of the mobile bar, said nose wheel assembly being further releasably receiving the towing bar while the nose wheel assembly is connected to said tongue;

A compartment, mounted on said frame, defined by a pair of transversely spaced apart longitudinally extending front and rear wall members, and a pair of longitudinally spaced apart transversely extending vertically disposed side wall members interconnecting the front and rear wall members at opposite ends thereof;

Braking and turning indicators mounted on said rear wall, meeting the requirements of a street-legal trailer, for allowing the mobile bar to be towed on a public road by a motorized vehicle;

A generally flat fixed counter top member closing the entire top of the compartment that may be used as a bar for refreshments;

A canopy, telescopically supported relative to the counter top members to be elevated thereabove to provide a shade and weather protective element therefore when extended and a protective cover for the counter top member when collapsed;

At least one seat member pivotally mounted on said rear wall member pivotable between a first extended position for use by an individual and a second stowed position against its wall member for towing;

Means, mounted in the compartment, for providing refrigeration,

At least one battery mounted in said compartment for providing electrical power to the mobile bar; and, A beverage dispensing system mounted in said compartment for providing liquid refreshment.

29. A mobile bar as in claim 28 wherein said beverage dispensing system is further connected to an external beverage dispensing system.

30. A mobile bar as in claim 28 wherein said refrigeration means comprises an insulated ice chest.

31. A mobile bar as in claim 28 wherein said refrigeration means comprises an electrically powered refrigeration unit.

32. A mobile bar as in claim 28 further comprising:

a foot railing mounted on the lower portion of at least the rear wall member.

33. A mobile bar as in claim 32 further comprising:

a plurality of electrical lights mounted on said canopy and powered by said at least one battery.

34. A mobile bar as in claim 28 further comprising:

means connected to said canopy for raising and lowering said canopy.

35. A mobile bar as in claim 34 wherein said means for raising and lowering said canopy comprises an electrically actuated motorized assembly.

* * * * *